(12) United States Patent
Czapla et al.

(10) Patent No.: US 12,535,038 B2
(45) Date of Patent: Jan. 27, 2026

(54) POWERPLANT FOR AN AIRCRAFT

(71) Applicants: Airbus SAS, Blagnac (FR); Airbus Operations SAS, Toulouse (FR)

(72) Inventors: Lionel Czapla, Toulouse (FR); Alexis Pissavin, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 18/883,246

(22) Filed: Sep. 12, 2024

(65) Prior Publication Data

US 2025/0092829 A1 Mar. 20, 2025

(30) Foreign Application Priority Data

Sep. 18, 2023 (FR) ........................................ 2309846

(51) Int. Cl.
*F02C 7/224* (2006.01)
*F02C 7/22* (2006.01)

(52) U.S. Cl.
CPC .......... *F02C 7/22* (2013.01); *F05D 2220/323* (2013.01)

(58) Field of Classification Search
CPC .. F02C 7/22; F02C 7/224; F02C 7/047; F05D 2220/323
See application file for complete search history.

(56) References Cited

U.S. PATENT DOCUMENTS

| 2,560,118 A * | 7/1951 | Mckinnell ................. F02C 7/22 |
| | | 60/804 |
| 2015/0267616 A1 | 9/2015 | Verseux |
| 2017/0002746 A1 | 1/2017 | Sawyers-Abbott et al. |
| 2020/0256252 A1* | 8/2020 | Smith ..................... F02C 7/224 |
| 2021/0261267 A1 | 8/2021 | Sommerer et al. |
| 2022/0349343 A1 | 11/2022 | Durocher |
| 2022/0403783 A1* | 12/2022 | Miller ...................... F02C 7/22 |
| 2023/0022291 A1* | 1/2023 | Carretero Benignos .................... |
| | | B64D 33/02 |
| 2023/0194097 A1 | 6/2023 | Hart et al. |

OTHER PUBLICATIONS

French Search Report for corresponding French Patent Application No. 2309846 dated Mar. 5, 2024.

* cited by examiner

*Primary Examiner* — Steven M Sutherland
(74) *Attorney, Agent, or Firm* — Greer, Burns & Crain, Ltd.

(57) ABSTRACT

A powerplant for an aircraft, comprising a propulsion system with a core enclosed in a casing and having a combustion chamber, a supply pipe conveying dihydrogen to the combustion chamber by passing through the casing in an injection zone, and a closed enclosure, delimited by first and second walls and containing a downstream pipe, a treatment system for treating the dihydrogen, and the injection zone, wherein the first wall is formed by part of the casing.

10 Claims, 5 Drawing Sheets

POWERPLANT FOR AN AIRCRAFT

CROSS-REFERENCES TO RELATED APPLICATIONS

This application claims the benefit of French Patent Application Number 2309846 filed on Sep. 18, 2023, the entire disclosure of which is incorporated herein by way of reference.

FIELD OF THE INVENTION

The present invention relates to a powerplant for an aircraft engine that operates using dihydrogen, and to an aircraft comprising at least one such powerplant.

BACKGROUND OF THE INVENTION

In order to move, an aircraft conventionally comprises at least one powerplant comprising a propulsion system such as a turbojet engine. Such a propulsion system comprises a core that is enclosed in a casing and comprises, inter alia, from upstream to downstream, a compressor, a combustion chamber, and a turbine.

In order to reduce the carbon dioxide ($CO_2$) emissions of aircraft engines, it is known practice to use dihydrogen as a fuel. The aircraft then comprises a dihydrogen tank and the propulsion system is supplied with dihydrogen by means of pipes that run in the aircraft, between the tank and each propulsion system, and on which treatment systems such as pumps, heaters, and valves are installed.

Safety must be ensured in the event of an incident on the supply line between the tank and the engine. To this end, it is known practice to put in place various safety systems.

Although such an arrangement is effective, it requires heavy installations with a large footprint, and there is therefore a need to find a novel arrangement in which, inter alia, the footprint and weight are reduced.

SUMMARY OF THE INVENTION

An object of the present invention is to propose a powerplant supplied with dihydrogen and comprising treatment systems that are enclosed in an enclosure one wall of which is formed by a casing of a propulsion system of the powerplant.

To that end, a powerplant for an aircraft is proposed, comprising:
  a nacelle,
  a propulsion system housed in the nacelle and comprising a core that is enclosed in a casing and has a combustion chamber,
  a supply pipe suitable for conveying dihydrogen to the combustion chamber by passing through the casing in an injection zone,
  at least one treatment system arranged on the supply pipe and suitable for treating said dihydrogen conveyed in the supply pipe, and
  a closed enclosure, delimited by a first wall and a second wall and containing a downstream pipe of the supply pipe, at least one treatment system, and the injection zone, wherein the first wall is formed by part of the casing.

With such an arrangement, the footprint and weight of each enclosure are reduced because at least one wall of the enclosure is formed by the casing of the propulsion system.

According to one particular embodiment, said enclosure comprises at least one ventilation system suitable for discharging the gases present in the enclosure to the outside of the aircraft.

Advantageously, at least one ventilation system takes the form of an air inlet passing through the second wall and through which air from outside the aircraft enters the enclosure, and an air outlet passing through the second wall and through which the gases present in the enclosure are exhausted to the outside of the aircraft.

Advantageously, at least one ventilation system takes the form of a pressure limiter mounted on the second wall and through which the gases present in the enclosure are exhausted to the outside of the aircraft.

According to one particular embodiment, said enclosure is formed by a first sub-enclosure in which the injection zone is arranged, and a second sub-enclosure separated from the first sub-enclosure by a separating wall, wherein the downstream pipe passes through the second sub-enclosure and then the first sub-enclosure to reach the injection zone by passing through the separating wall, wherein each sub-enclosure is closed and delimited by a first wall, a second wall, and the separating wall, wherein the first wall defining each sub-enclosure is formed by part of the casing.

According to one particular embodiment, the powerplant comprises a ventilation system that takes the form of an air inlet passing through the second wall of the first sub-enclosure and through which air from outside the aircraft enters the first sub-enclosure, an air outlet passing through the second wall of the second sub-enclosure and through which the gases present in the second sub-enclosure are exhausted to the outside of the aircraft, and an air passage passing through the separating wall and emerging on one side in the first sub-enclosure and on the other side in the second sub-enclosure.

According to one particular embodiment, the powerplant comprises a ventilation system that takes the form of an air inlet passing through the second wall of the first sub-enclosure and through which air from outside the aircraft enters the first sub-enclosure, and an air outlet passing through the second wall of the first sub-enclosure and through which the gases present in the first sub-enclosure are exhausted to the outside of the aircraft.

Advantageously, the downstream pipe passes sealably through the separating wall.

Advantageously, at least one sub-enclosure has a ventilation system that takes the form of a pressure limiter mounted on the second wall of said sub-enclosure and through which the gases present in said sub-enclosure are exhausted to the outside of the aircraft.

Advantageously, at least one treatment system comprises a treatment part in which the dihydrogen is treated, and a non-treatment part in which there is no dihydrogen, the treatment part and the non-treatment part are sealed from each other, the treatment system is arranged through an opening in the second wall and sealably fastened to said second wall, and the treatment part is positioned in the enclosure or the corresponding sub-enclosure, and the non-treatment part is positioned outside the enclosure or the corresponding sub-enclosure.

The invention also proposes an aircraft comprising a dihydrogen tank and at least one powerplant according to one of the preceding variants, wherein the supply pipe is fluidly connected to the dihydrogen tank.

BRIEF DESCRIPTION OF THE DRAWINGS

The aforementioned features of the invention, and others, will become more clearly apparent on reading the following description of one exemplary embodiment, said description being given with reference to the appended drawings, in which.

DETAILED DESCRIPTION OF THE PREFERRED EMBODIMENTS

Figure 1:
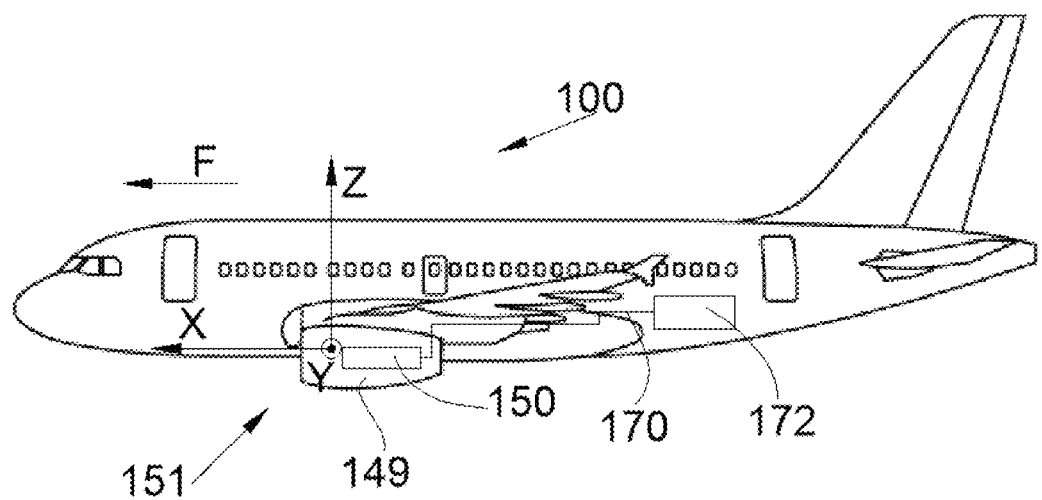
FIG. 1 is a side view of an aircraft comprising a powerplant according to the invention.

In the following description, terms relating to position are given with reference to an aircraft in a position of forward travel, i.e. as shown in FIG. 1, in which the arrow F shows the direction of forward travel of the aircraft.

In the following description, as is conventional, the longitudinal axis of the propulsion system, which is parallel to the longitudinal axis of the aircraft positively oriented towards the front in the direction of forward travel of the aircraft, is referred to as X, the transverse axis, which is horizontal when the aircraft is on the ground, is referred to as Y, and the vertical axis or vertical height when the aircraft is on the ground is referred to as Z, these three axes X, Y and Z being orthogonal to each other.

FIG. 1 shows an aircraft 100 that has a fuselage 102 on either side of which is fastened a wing 104. Under each wing 104 is fastened at least one powerplant 151 comprising a nacelle 149 consisting of cowls 147 forming an aerodynamic outer surface.

Figure 2:
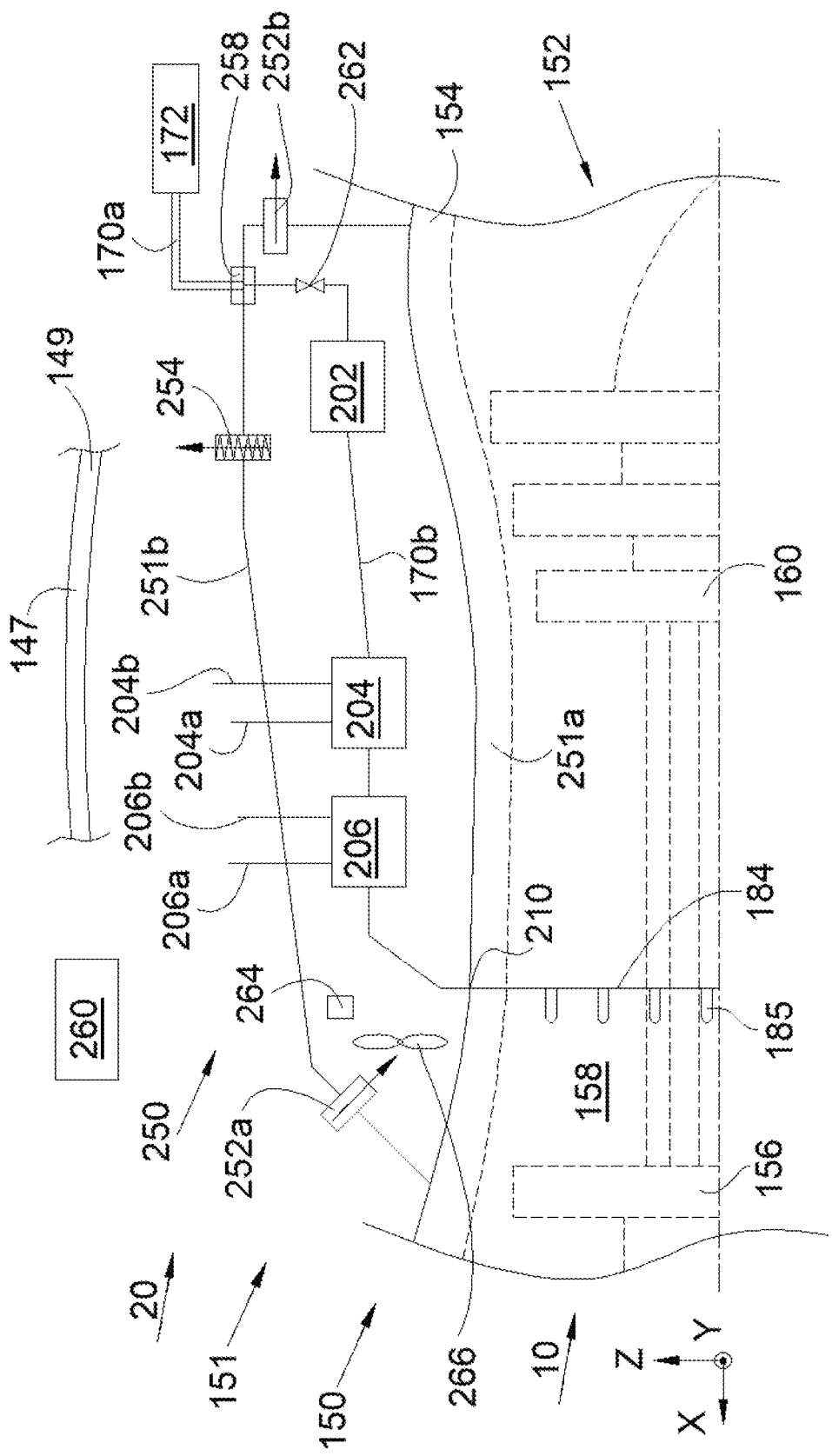
FIG. 2 is a schematic side view of the powerplant according to a first embodiment of the invention.

FIG. 2 shows a powerplant 151 according to a first embodiment of the invention, which also comprises a propulsion system 150 that is shown schematically and is housed inside the nacelle 149.

In the embodiment of the invention shown in FIG. 2, the propulsion system 150 is a turbojet engine that comprises a core 152 enclosed in a casing 154 that is generally cylindrical about the longitudinal axis X.

Outside air enters the nacelle 149 through an opening provided in the cowls 147 at the front of the nacelle 149.

Inside the nacelle 149, the air flow splits into a primary flow 10 and a secondary flow 20. The primary flow 10 enters the core 152 to supply a combustion chamber 158 with dioxygen and the secondary flow 20 flows around the core 152 before being discharged at the rear of the nacelle 149.

The casing 154 is thus open at the front to allow the introduction of the primary flow 10 into the core 152 and open at the rear to allow the gases produced by combustion to be exhausted through a nozzle. Here, the core 152 comprises, from upstream to downstream, a compressor 156, a combustion chamber 158, and a turbine 160. The compressor 156 and the turbine 160 are provided with blades rotating about the longitudinal axis X.

The primary flow 10 thus passes in succession through the compressor 156 where it is compressed before being injected into the combustion chamber 158 where it is mixed with the fuel. The gases produced by combustion then pass through the turbine 160 and rotate it. The turbine 160 in turn rotates the compressor 156 and the gases are then discharged at the rear.

The powerplant 151 also comprises a supply pipe 170a-b that makes it possible to convey dihydrogen from a dihydrogen tank 172 of the aircraft 100 to the combustion chamber 158. The supply pipe 170a-b is fluidly connected to the dihydrogen tank 172 and here, it snakes outside the casing 154 to the combustion chamber 158, which it reaches by passing through the casing 154 in an injection zone 210.

The pipe 170a-b is broken down into an upstream pipe 170a and a downstream pipe 170b.

In the embodiment of the invention shown in FIG. 2, the downstream pipe 170b is provided, in the injection zone 210, with an injector manifold 184 provided with injectors 185 that drop down into the combustion chamber 158 through the casing 154.

In order to prepare the dihydrogen upstream of the combustion chamber 158, the powerplant 151 comprises at least one treatment system 202, 204, 206, such as heaters, pumps, etc., that are suitable for treating the dihydrogen circulating in the supply pipe 170a-b.

Each treatment system 202, 204, 206, which here are at least three in number, is arranged along the supply pipe 170a-b, and more particularly on the supply pipe 170a-b in order to interact directly with the dihydrogen circulating therein.

The powerplant 151 comprises an enclosure 250 delimited by walls 251a-b, namely a first wall 251a and a second wall 251b. The first wall 251a can be formed by a plurality of sub-walls rigidly connected to each other.

The supply pipe 170a-b is broken down into the upstream pipe 170a, which is between the tank 172 and the enclosure 250, and the downstream pipe 170b inside the enclosure 250 up to the combustion chamber 158.

The enclosure 250 contains the downstream pipe 170b, at least one treatment system 202, 204, 206, and the injection zone 210. If dihydrogen leaks from a treatment system 202, 204, 206 present in the enclosure 250, the dihydrogen thus remains contained in the enclosure 250, which is closed relative to the rest of the powerplant 151.

The enclosure 250 thus forms a containment tank for the dihydrogen around the downstream pipe 170b and the treatment systems 202, 204, 206.

In order to save material, and therefore space and weight, the first wall 251a of the enclosure 250 is formed by part of the casing 154. Some of the weight of the enclosure 250 is thus already included in the weight of the casing 154, and the treatment systems 202, 204, 206 are as close as possible to the casing 154 in order to save space around them.

The second wall 251b of the enclosure 250 is sealably fastened to the casing 154 by any appropriate means, such as welding, rivets with seals, etc.

In the embodiment of the invention shown in FIG. 2, the upstream pipe 170a is a double-skin pipe comprising an inner pipe in which the dihydrogen flows, and an outer pipe around the inner pipe that is evacuated or filled with a gas that is neutral with respect to dihydrogen, such as dinitrogen.

Due to the installation of the enclosure 250, the downstream pipe 170b is a single-skin pipe that extends the inner pipe, as the enclosure 250 acts as a double skin, which also results in a simplification.

The pipe 170a-b passes sealably through the second wall 251b in a feedthrough system 258 through which only the inner pipe passes here. Such a feedthrough system 258 is known to a person skilled in the art and is not described in greater detail as it does not directly form part of the invention.

In order to assist in the discharge of the dihydrogen from the enclosure 250, the enclosure comprises, particularly on the second wall 251b, at least one ventilation system 252a-b that ensures the discharge of the gases, particularly air and dihydrogen, present in the enclosure 250, to the outside of the aircraft 100.

In the embodiment of the invention shown in FIG. 2, a ventilation system 252a-b takes the form of an air inlet 252a and an air outlet 252b, which both pass through the second wall 251b. The air inlet ensures the entry of air from outside the aircraft 100 into the enclosure 250, and more particularly here the air originating from the secondary flow 20 when the powerplant 151 is in operation. The air outlet 252b ensures the discharge of the gases present in the enclosure 250, which are thus exhausted to the outside of the aircraft 100.

The gases that are exhausted through the air outlet 252b are discharged directly to the outside of the nacelle 149 by means of a dedicated pipe that emerges on the outside by passing through a cowl 147, or directly into the secondary flow 20.

Instead or in addition, a ventilation system takes the form of a pressure limiter 254 mounted on the second wall 251b and through which the gases present in the enclosure 250 are exhausted to the outside of the aircraft 100.

As with the air outlet 252b, the gases that are exhausted through the pressure limiter 254 are discharged directly to the outside of the nacelle 149 by means of a dedicated pipe that emerges on the outside by passing through a cowl 147, or directly into the secondary flow 20.

The installation of the pressure limiter 254 makes it possible to supplement the air inlet 252a and the air outlet 252b, in particular, when there is a sudden increase in pressure in the enclosure 250 and the air outlet 252b is not sufficient to discharge this excess pressure.

Figure 3:
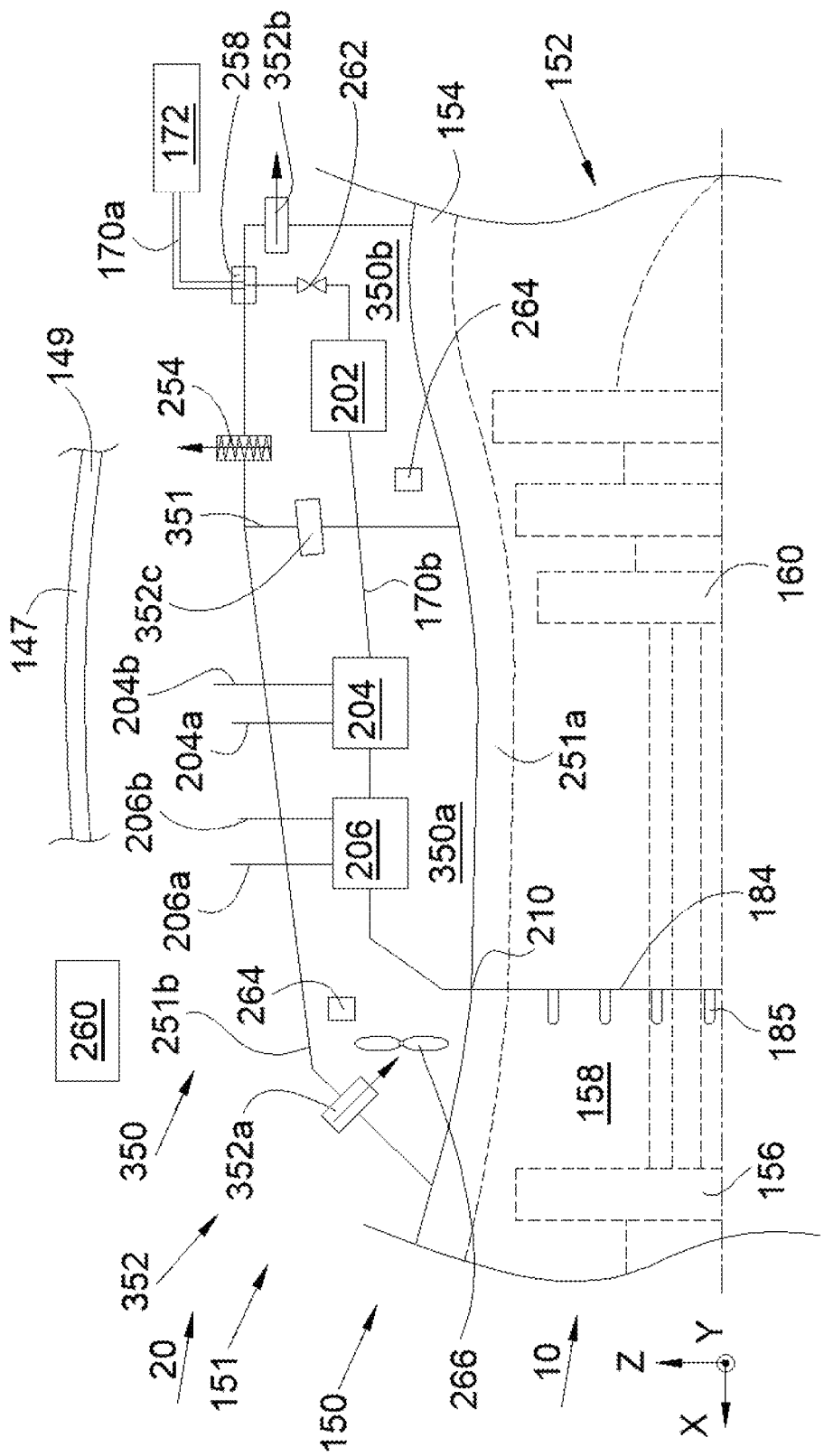
FIG. 3 is a schematic side view of the powerplant according to a second embodiment of the invention.

FIG. 3 shows a powerplant 151 according to a second embodiment of the invention, wherein the enclosure 350 is formed by a first sub-enclosure 350a and a second sub-enclosure 350b that is separated from the first sub-enclosure 350a by a common separating wall 351.

The injection zone 210 is arranged in the first sub-enclosure 350a, and the downstream pipe 170b passes through, from the upstream pipe 170a and in the direction of flow of the dihydrogen, the second sub-enclosure 350b and then the first sub-enclosure 350a to reach the injection zone 210 by passing through the separating wall 351.

Each sub-enclosure 350a-b is closed and delimited by a first wall 251a, a second wall 251b, and the separating wall 351, and as previously, the first wall 251a defining each sub-enclosure 350a-b is formed by part of the casing 154. Of course, there can be more than two sub-enclosures one after the other.

According to one particular embodiment, each sub-enclosure 350a-b contains at least one treatment system 202, 204, 206. In the embodiment of the invention shown in FIG. 3, the first sub-enclosure 350a contains the treatment systems 204 and 206, such as heaters, and the second sub-enclosure 350b contains the treatment system 202, such as a pump.

According to one particular embodiment, the powerplant 151 in FIG. 3 comprises a ventilation system 352 that takes the form of an air inlet 352a passing through the second wall 251b of the first sub-enclosure 350a, an air outlet 352b passing through the second wall 251b of the second sub-enclosure 350b, and an air passage 352c passing through the separating wall 351 and emerging on one side in the first sub-enclosure 350a and on the other side in the second sub-enclosure 350b.

An outside air flow originating for example from the secondary flow 20 thus enters the first sub-enclosure 350a through the air inlet 352a. The air flow then passes through the first sub-enclosure 350a where, potentially, it collects dihydrogen, and the gases thus present in the first sub-enclosure 350a pass through the separating wall 351 via the air passage 352c to enter the second sub-enclosure 350b, which they leave through the air outlet 352b to the outside of the aircraft 100.

As previously, the gases that are exhausted through the air outlet 352b are discharged directly to the outside of the nacelle 149 by means of a dedicated pipe that emerges on the outside by passing through a cowl 147, or directly into the secondary flow 20.

As previously, a pressure limiter 254 can be mounted on the second wall 251b of one and/or the other of the sub-enclosures 350a-b.

Figure 4:
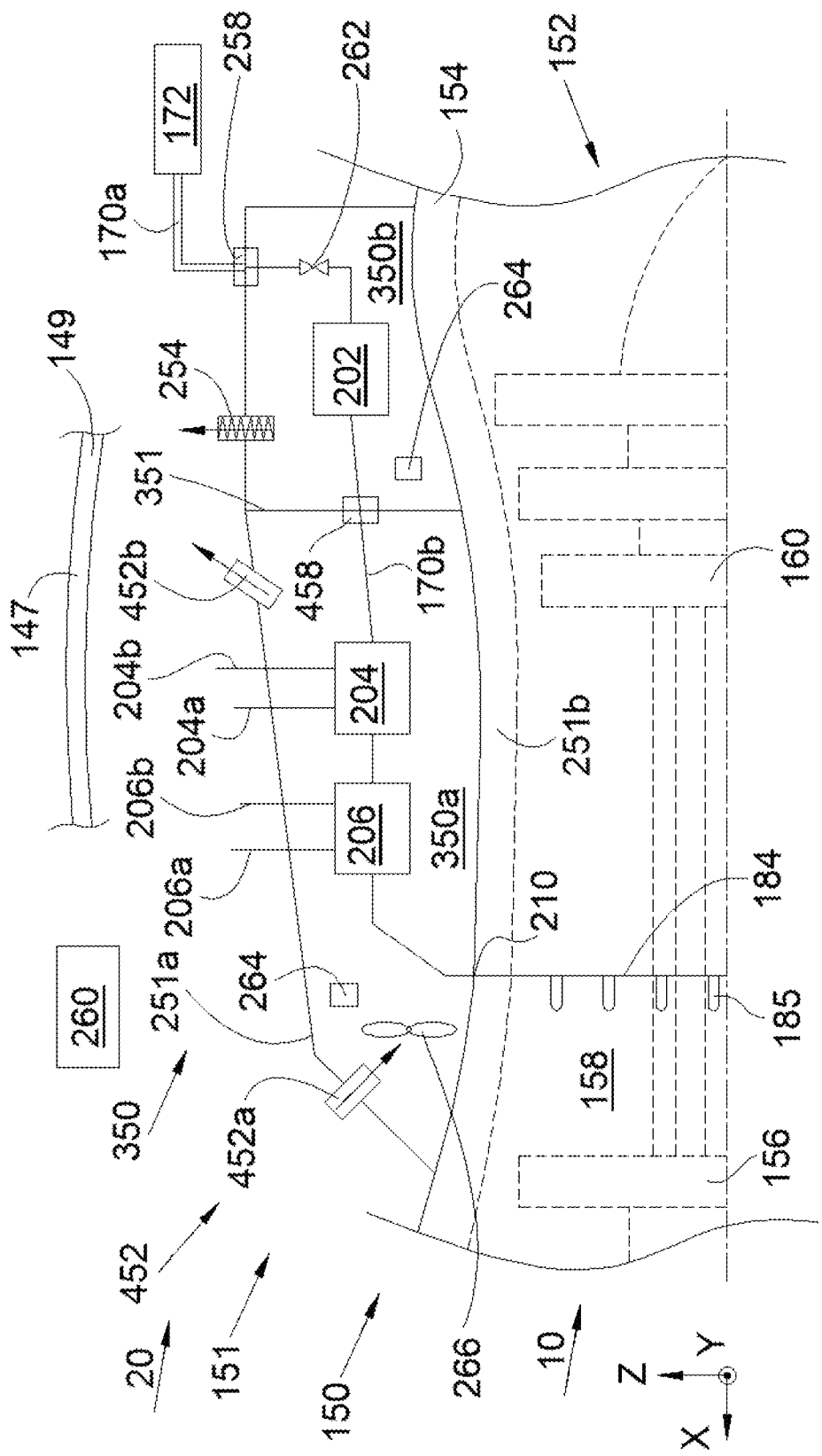
FIG. 4 is a schematic perspective view of a powerplant according to a third embodiment of the invention.

FIG. 4 shows a powerplant 151 according to a third embodiment of the invention that is generally identical to the second embodiment in FIG. 3, but with a different ventilation system 452.

This embodiment comprises the enclosure 350 formed by two sub-enclosures 350a-b and separated by the separating wall 351, wherein the injection zone 210 is arranged in the first sub-enclosure 350a and wherein the downstream pipe 170b passes through the second sub-enclosure 350b and then the first sub-enclosure 350a to reach the injection zone 210 by passing through the separating wall 351.

In this embodiment, the second sub-enclosure 350b is entirely enclosed so as to prevent any dihydrogen that might be present therein from leaving. According to one particular embodiment, the second sub-enclosure 350b is rendered inert with dinitrogen for example, or it is evacuated.

In this embodiment, the downstream pipe 170b passes sealably through the separating wall 351 in a feedthrough system 458. Such a feedthrough system 458 is known to a person skilled in the art and is not described in greater detail as it does not directly form part of the invention.

In this particular embodiment, the ventilation system 452 takes the form of an air inlet 452a passing through the second wall 251b of the first sub-enclosure 350a and an air outlet 452b passing through the second wall 251b of the first sub-enclosure 350a. There is therefore no longer an air passage through the separating wall 351.

An outside air flow originating for example from the secondary flow 20 thus enters the first sub-enclosure 350a through the air inlet 452a. The air flow then passes through the first sub-enclosure 350a where, potentially, it collects dihydrogen, and the gases thus present in the first sub-enclosure 350a leave through the air outlet 452b to the outside of the aircraft 100.

In this embodiment, the downstream pipe 170b preferably passes sealably through the separating wall 351 in order to avoid any passage of dihydrogen originating from a leak inside one sub-enclosure 350a-b to the other sub-enclosure 350b-a.

As previously, the gases that are exhausted through the air outlet 452b are discharged directly to the outside of the nacelle 149 by means of a dedicated pipe that emerges on the outside by passing through a cowl 147, or directly into the secondary flow 20.

As previously, a pressure limiter 254 can be mounted on the second wall 251b of one and/or the other of the sub-enclosures 350a-b.

According to one particular embodiment of the invention, the treatment system 202 is a pump, particularly a high-pressure pump, which is housed in the second sub-enclosure 350b and propels the dihydrogen to the combustion chamber 158. This installation in which the pump is alone in a sub-enclosure 350b makes it possible to ensure thermal insulation around the pump.

Here, the treatment systems 204 and 206 are heat exchangers that ensure heat exchanges between the dihydrogen and heat transfer fluids circulating in exchange pipes 204a-b and 206a-b that are fluidly connected to a heat source.

In one variant of each of the embodiments described, in order to detect the presence of dihydrogen in the enclosure 250 or the sub-enclosures 350a-b, said enclosure 250 and each sub-enclosure 350a-b are provided with a monitoring system 264 capable of detecting a change in said enclosure 250 and said sub-enclosure 350a-b. The monitoring system 264 can for example be a pressure sensor, a dihydrogen detector, or other element.

The powerplant 151 comprises a stop valve 262 mounted on the downstream pipe 170b, upstream of the first treatment system 202, wherein the stop valve 262 can alternately adopt an open position in which the dihydrogen can pass through or a closed position in which the dihydrogen is prevented from passing through. The stop valve 262 is preferably an electrically, pneumatically or otherwise controlled valve.

The powerplant 151 comprises a control unit 260 that is connected to each monitoring system 264 and to the stop valve 262, and as a function of the information delivered by each monitoring system 264, the control unit 260 commands the stop valve 262 to open when no dihydrogen is detected or to close when dihydrogen is detected.

In order to assist with improved discharge of the dihydrogen in the event of a leak in the enclosure 250 and each sub-enclosure 350a-b fluidly connected to an air outlet 252b, 352b, 452b, a fan 266 commanded by the control unit 260 can be installed in the enclosure 250 and each sub-enclosure 350a-b.

Thus, when the presence of dihydrogen is detected in the enclosure 250 or a sub-enclosure 350a-b by the relevant monitoring system 264, the control unit 260 commands the relevant fan 266 to start so as to accelerate the discharge of the dihydrogen through the relevant air outlet 252b, 352b, 452b.

Figure 5:
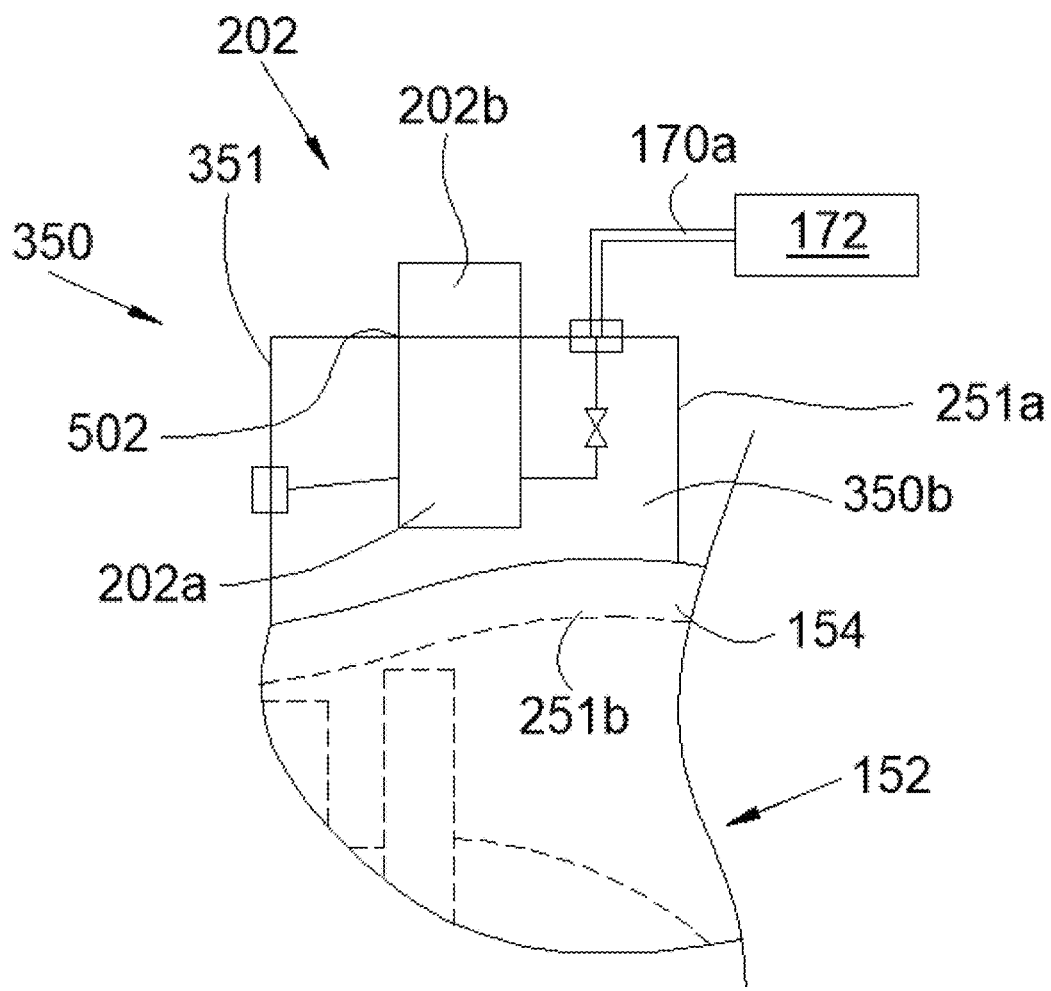
FIG. 5 is a schematic detail view of a variant of the invention, and FIG. 6 schematically illustrates an example of a control unit implemented in the invention.
Figure 6:
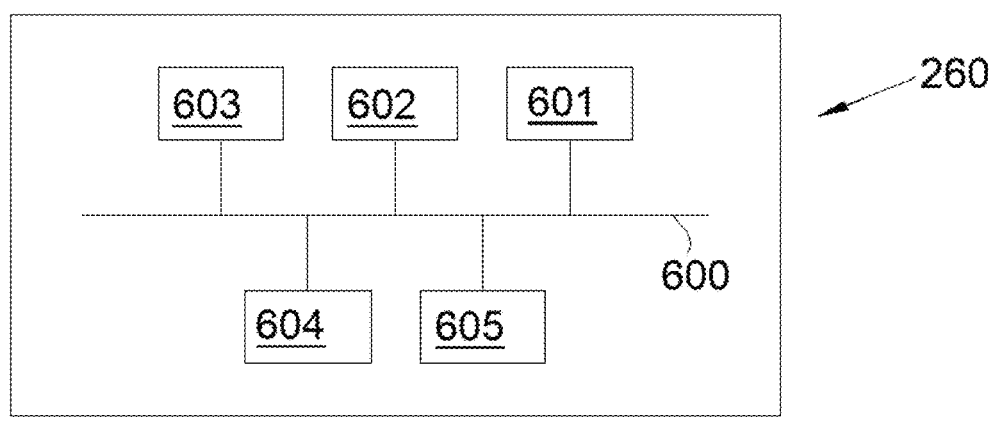

FIG. 5 shows a variant that is applied to the treatment system 202 here, but it can be applied to each treatment system 204, 206.

In this variant, the treatment system 202 is split into a treatment part 202a and a non-treatment part 202b, which are sealed from each other.

The treatment part 202a is the part in which the dihydrogen is treated, such as for example the pipes of an exchanger in which the dihydrogen circulates, the part of a pump in which the dihydrogen circulates, etc.

The non-treatment part 202b is the part in which there is no dihydrogen, such as the pipes of an exchanger in which a heat transfer fluid circulates, the motor of a pump, etc.

The second wall 251b is pierced by an opening 502 that communicates between the inside of the enclosure 250 or the corresponding sub-enclosure 350a-b and the outside of the powerplant 151, and here of the enclosure 250 or the corresponding sub-enclosure 350a-b.

The treatment system 202 is arranged through the opening 502 and it is sealably fastened to the second wall 251b so that the treatment part 202a is positioned in the enclosure 250 or the corresponding sub-enclosure 350a-b and the non-treatment part 202b is positioned outside the enclosure 250 or corresponding sub-enclosure 350a-b.

According to one embodiment, the control unit 260 comprises, connected by a communication bus 600: a CPU (central processing unit) 601; a RAM (random access memory) 602; a ROM (read-only memory) 603; a storage unit 604 such as a hard disk or a storage medium reader such as an SD (secure digital) card reader; and at least one communication interface 605, for example allowing the control unit to communicate with the monitoring systems, the stop valve, the fans, etc.

The processor is capable of executing instructions loaded into the RAM from the ROM, an external memory (not shown), a storage medium (such as an SD card), or a communication network. When the equipment is switched on, the processor is capable of reading and executing instructions from the RAM. These instructions form a computer program causing the implementation, by the processor, of all or some of the algorithms and steps described.

All or some of the algorithms and steps described below can be implemented in software form by the execution of a set of instructions by a programmable machine, for example a DSP (digital signal processor) or a micro-controller, or implemented in hardware form by a machine or a dedicated component, for example an FPGA (field-programmable gate array) or an ASIC (application-specific integrated circuit).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A powerplant for an aircraft comprising:
a nacelle,
a propulsion system housed in the nacelle and comprising a core enclosed in a casing and having a combustion chamber,
a supply pipe configured to convey dihydrogen to the combustion chamber by passing through the casing in an injection zone,
at least one treatment system arranged on the supply pipe and configured for treating said dihydrogen conveyed in the supply pipe, and
a closed enclosure, delimited by a first wall and a second wall, and containing a downstream pipe of the supply pipe, at least one treatment system, and the injection zone, wherein the first wall is formed by part of the casing,
wherein said closed enclosure is formed by a first sub-enclosure containing the injection zone, and a second sub-enclosure separated from the first sub-enclosure by a separating wall,
wherein the downstream pipe passes through the second sub-enclosure and then the first sub-enclosure to reach the injection zone by passing through the separating wall,
wherein each sub-enclosure is closed and delimited by a first wall, a second wall, and the separating wall, and
wherein the first wall defining each sub-enclosure is formed by part of the casing.

2. The powerplant as claimed in claim 1, wherein said closed enclosure comprises at least one ventilation system configured for discharging gases present in the closed enclosure to the outside of the aircraft.

3. The powerplant as claimed in claim 2, wherein the at least one ventilation system comprises
  an air inlet passing through the second wall and through which air from outside the aircraft enters the closed enclosure, and
  an air outlet passing through the second wall and through which the gases present in the closed enclosure are exhausted to the outside of the aircraft.

4. The powerplant as claimed in claim 2, wherein the at least one ventilation system comprises a pressure limiter mounted on the second wall and through which the gases present in the closed enclosure are exhausted to the outside of the aircraft.

5. The powerplant as claimed in claim 1, further comprising:
  a ventilation system including
    an air inlet passing through the second wall of the first sub-enclosure and through which air from outside the aircraft enters the first sub-enclosure,
    an air outlet passing through the second wall of the second sub-enclosure and through which gases present in the second sub-enclosure are exhausted to the outside of the aircraft, and
    an air passage passing through the separating wall and emerging on one side in the first sub-enclosure and on another side in the second sub-enclosure.

6. The powerplant as claimed in claim 1, further comprising:
  a ventilation system including
    an air inlet passing through the second wall of the first sub-enclosure and through which air from outside the aircraft enters the first sub-enclosure, and
    an air outlet passing through the second wall of the first sub-enclosure and through which gases present in the first sub-enclosure are exhausted to the outside of the aircraft.

7. The powerplant as claimed in claim 6, wherein the downstream pipe passes sealably through the separating wall.

8. The powerplant as claimed in claim 1, wherein at least one sub-enclosure has a ventilation system comprising a pressure limiter mounted on the second wall of said sub-enclosure and through which gases present in said sub-enclosure are exhausted to the outside of the aircraft.

9. The powerplant as claimed in claim 1, wherein at least one treatment system comprises
  a treatment part in which the dihydrogen is treated, and
  a non-treatment part in which there is no dihydrogen,
    wherein the treatment part and the non-treatment part are sealed from each other,
  wherein the at least one treatment system is arranged through an opening in the second wall and sealably fastened to said second wall, and
  wherein the treatment part is positioned in the closed enclosure or the corresponding sub-enclosure, and the non-treatment part is positioned outside the closed enclosure or the corresponding sub-enclosure.

10. An aircraft comprising:
  a dihydrogen tank and
  at least one powerplant as claimed in claim 1, wherein the supply pipe is fluidly connected to the dihydrogen tank.

* * * * *